(12) United States Patent
Dolzinski et al.

(10) Patent No.: US 9,586,668 B2
(45) Date of Patent: Mar. 7, 2017

(54) FUSELAGE CELL STRUCTURE FOR AN AIRCRAFT IN HYBRID DESIGN

(75) Inventors: Wolf-Dietrich Dolzinski, Ganderkesee (DE); Norbert Heltsch, Hamburg (DE); Arne Hartwig, Hamburg (DE); Markus Mueller, Friedrichshafen (DE); Markus Joerg Weber, Hamburg (DE); Jens-Ulrich Prowe, Hamburg (DE); Paul Joern, Hamburg (DE)

(73) Assignee: Airbus Operations GmbH (DE)

( * ) Notice: Subject to any disclaimer, the term of this patent is extended or adjusted under 35 U.S.C. 154(b) by 1160 days.

(21) Appl. No.: 13/257,367

(22) PCT Filed: Mar. 16, 2010

(86) PCT No.: PCT/EP2010/053331
§ 371 (c)(1),
(2), (4) Date: Nov. 1, 2011

(87) PCT Pub. No.: WO2010/106040
PCT Pub. Date: Sep. 23, 2010

(65) Prior Publication Data
US 2012/0056037 A1  Mar. 8, 2012

Related U.S. Application Data

(60) Provisional application No. 61/160,872, filed on Mar. 17, 2009.

(30) Foreign Application Priority Data

Mar. 17, 2009 (DE) .................. 10 2009 013 585

(51) Int. Cl.
*B64C 1/12* (2006.01)
*B64C 1/06* (2006.01)
*B64C 1/00* (2006.01)

(52) U.S. Cl.
CPC ............... *B64C 1/12* (2013.01); *B64C 1/064* (2013.01); *B64C 1/065* (2013.01); *B64C 2001/0072* (2013.01); *Y02T 50/433* (2013.01)

(58) Field of Classification Search
CPC  B64C 1/12; B64C 1/064; B64C 1/065; B64C 1/069
(Continued)

(56) References Cited

U.S. PATENT DOCUMENTS 2,334,844 A * 11/1943 Salter .................. B64C 1/12
                                                        403/408.1
3,145,000 A * 8/1964 Mackie .................. 244/123.6
(Continued)

FOREIGN PATENT DOCUMENTS

CN        101374721 A    2/2009
DE   10 2007 003 275 A1  7/2008
(Continued)

OTHER PUBLICATIONS

English summary of SU 466724 (Derwent and machine translation).*
(Continued)

*Primary Examiner* — Tien Dinh
*Assistant Examiner* — Alexander Giczy
(74) *Attorney, Agent, or Firm* — Lerner, David, Littenberg, Krumholz & Mentlik, LLP

(57) ABSTRACT

A fuselage cell structure for an aircraft includes at least two skin panels including at least one double shell skin panel and at least one monolithic skin panel. At least one longitudinal brace or a transverse brace is disposed so as to form at least one of longitudinal seam or a transverse seam between the double shell skin panel and the monolithic skin panel. The fuselage cell structure includes at least one of a longitudinal bracket and a load transfer point. The longitudinal bracket is
(Continued)

disposed in a region of the longitudinal seam and includes a first and a second longitudinal flanges disposed offset with respect to one another and connected by a web. The load transfer point is disposed in a region of the transverse seam so as to connect the longitudinal brace disposed on the monolithic skin panel to the double shell skin panel.

16 Claims, 5 Drawing Sheets

(58) Field of Classification Search
USPC ............................... 244/119, 129.3, 131
See application file for complete search history.

(56) References Cited

U.S. PATENT DOCUMENTS

| | | | |
|---|---|---|---|
| 3,655,818 A * | 4/1972 | McKown | 428/118 |
| 4,344,995 A * | 8/1982 | Hammer | 428/61 |
| 4,606,961 A | 8/1986 | Munsen et al. | |
| 5,429,326 A * | 7/1995 | Garesche | B32B 3/10 |
| | | | 156/157 |
| 6,179,086 B1 | 1/2001 | Bansemir et al. | |
| 6,328,258 B1 * | 12/2001 | Porte | B64D 29/06 |
| | | | 244/53 B |
| 6,802,931 B2 | 10/2004 | Fujihira | |
| 7,182,291 B2 | 2/2007 | Westre et al. | |
| 8,715,808 B2 | 5/2014 | Roming et al. | |
| 8,876,048 B2 | 11/2014 | Herrmann et al. | |
| 8,882,040 B2 | 11/2014 | Stulc et al. | |
| 2004/0055248 A1 * | 3/2004 | Grillos | B64C 1/12 |
| | | | 52/783.1 |
| 2006/0060705 A1 | 3/2006 | Stulc et al. | |
| 2008/0217479 A1 * | 9/2008 | Wood | B60J 1/006 |
| | | | 244/129.3 |
| 2009/0277994 A1 * | 11/2009 | Lobato | B64C 1/061 |
| | | | 244/119 |
| 2009/0294589 A1 * | 12/2009 | Berry | B64C 1/12 |
| | | | 244/123.1 |
| 2010/0025532 A1 | 2/2010 | Herrmann et al. | |
| 2012/0056037 A1 | 3/2012 | Dolzinski et al. | |

FOREIGN PATENT DOCUMENTS

| | | |
|---|---|---|
| DE | 10 2007 008 988 A1 | 8/2008 |
| DE | 10 2007 029 500 A1 | 1/2009 |
| EP | 3 935 235 A2 | 8/1999 |
| JP | 2001-293738 A | 10/2001 |
| JP | 2008-514484 A | 5/2008 |
| JP | 2008-534353 A | 8/2008 |
| JP | 2010-507530 A | 3/2010 |
| SU | 320648 | 11/1971 |
| SU | 466724 A1 | 10/1991 |
| WO | 82/00974 A1 | 4/1982 |
| WO | 2008/105806 A2 | 9/2008 |
| WO | 2008/109217 A1 | 9/2008 |
| WO | 2010/106040 A2 | 9/2010 |

OTHER PUBLICATIONS

Trapezoid (USA definition) from http://www.mathopenref.com/trapezoid.html, accessed Mar. 18, 2016.*
Glare, Cytec industries website, http://www.cytec.com/engineered-materials/fiber-metal-laminates.htm, retrieved Oct. 24, 2011.
Chinese Office Action dated Aug. 5, 2013.
Chinese Office Action dated Jan. 13, 2014.
Response to Communication according to R 161(1) and 162 EPC dated Mar. 6, 2012.
German Office Action dated Jun. 10, 2011.
Russian Notice of Allowance dated Dec. 13, 2012.
Japanese Office Action dated Apr. 23, 2013.
Int'l Preliminary Report on Patentability dated Sep. 20, 2011 (PCT/EP2010/053331).
European Office Action dated Aug. 18, 2015.
European Office Action dated Mar. 10, 2016.

* cited by examiner

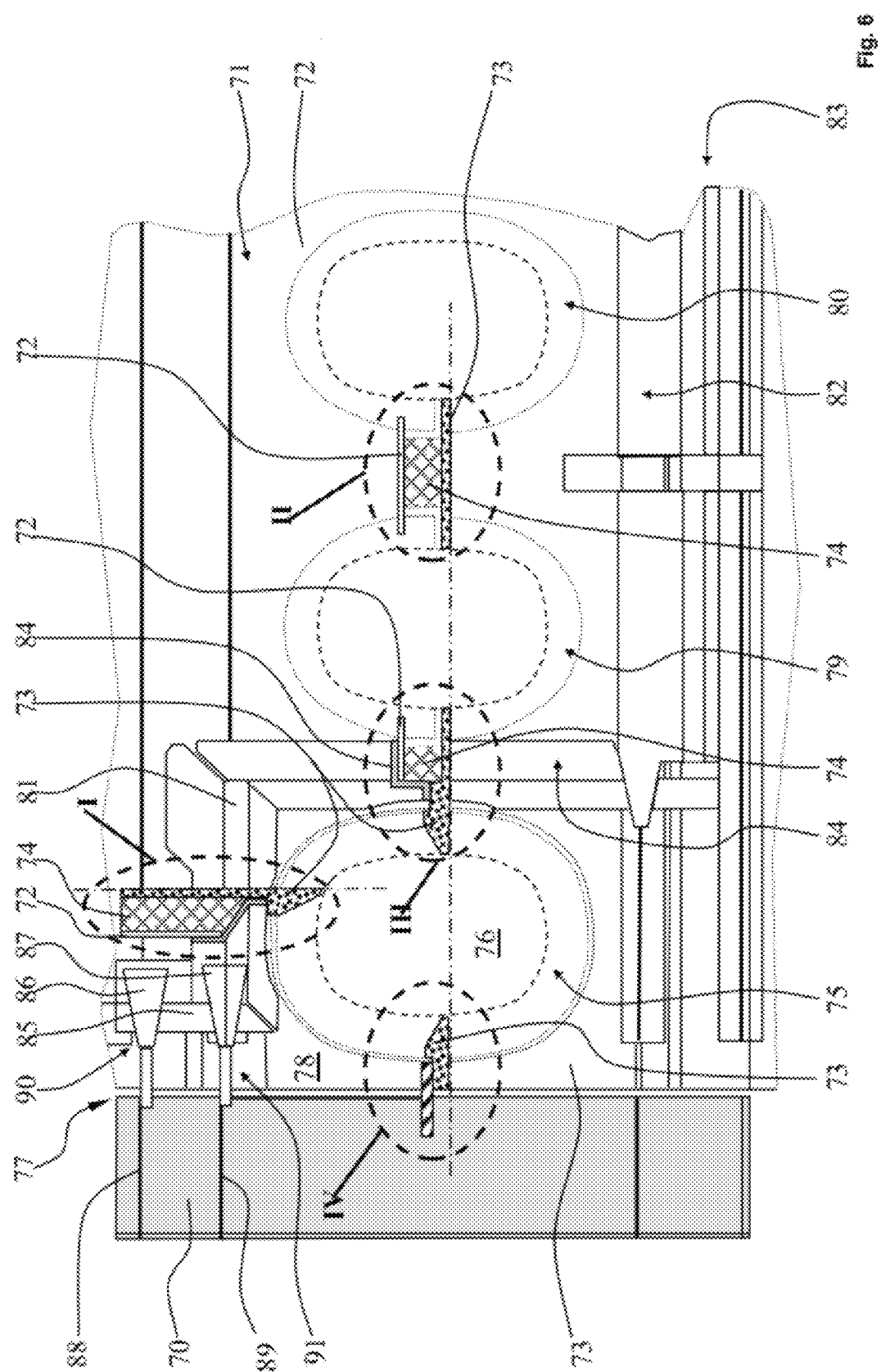

FUSELAGE CELL STRUCTURE FOR AN AIRCRAFT IN HYBRID DESIGN

CROSS REFERENCE TO PRIOR APPLICATIONS

This application is a U.S. National Phase application under 35 U.S.C. §371 of International Application No. PCT/EP2010/053331, filed on Mar. 16, 2010, and claims benefit to German Patent Application No. DE 10 2009 013 585.5, filed on Mar. 17, 2009 and U.S. Provisional Application No. 61/160,872, filed on Mar. 17, 2009. The International Application was published in German on Sep. 23, 2010 as WO 2010/106040 under PCT Article 21(2).

FIELD

The invention relates to a fuselage cell structure for an aircraft.

BACKGROUND

Aircraft fuselage cells, particularly of large-volume airliners, are usually realized with monolithic skin panels. The monolithic skin panels may be manufactured of metallic materials and/or composite fiber materials. In order to reinforce the monolithic skin panels, a plurality of longitudinal braces that are spaced apart and extend parallel to one another in the direction of flight, as well as transverse braces in the form of frame profiles that are arranged transverse to the direction of flight, are provided. The manufacture of the longitudinal braces and the frame segments and their mounting on a monolithic skin panel represent a significant manufacturing expenditure.

Fuselage cells with skin panels of double-shell construction are generally used in smaller types of aircraft. In skin panels of double-shell construction, plane sandwich elements and/or sandwich elements that at least sectionally feature at least a single curvature are used, wherein an inner and an outer cover layer are connected to one another by a core structure, for example, in the form of a honeycomb core, a rigid foam core or a folded honeycomb core such that they are spaced apart from one another by a defined distance. The cover layers may be manufactured of composite fiber materials, metallic materials or hybrid materials such as, for example, Glare®.

SUMMARY OF THE INVENTION

In an embodiment the present invention provides, a fuselage cell structure for an aircraft having at least two skin panels including at least one double shell skin panel and at least one monolithic skin panel. At least one brace which is at least one of a longitudinal and a transverse brace is disposed so as to form at least one of a longitudinal seam and a transverse seam between the at least one double shell skin panel and the at least one monolithic skin panel. The fuselage cell structure includes at least one of a longitudinal bracket and a load transfer point. The longitudinal bracket is disposed in a region of the longitudinal seam and includes a first and a second longitudinal flange that are disposed offset with respect to one another and connected by a web. The load transfer point is disposed in a region of the transverse seam so as to connect the longitudinal brace disposed on the at least one monolithic skin panel to the at least one double shell skin panel.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 6 shows a variation of a transverse seam between a monolithic and a double-shell skin panel with a window that is integrated into the region of the transverse seam.

DETAILED DESCRIPTION

Figure 1:
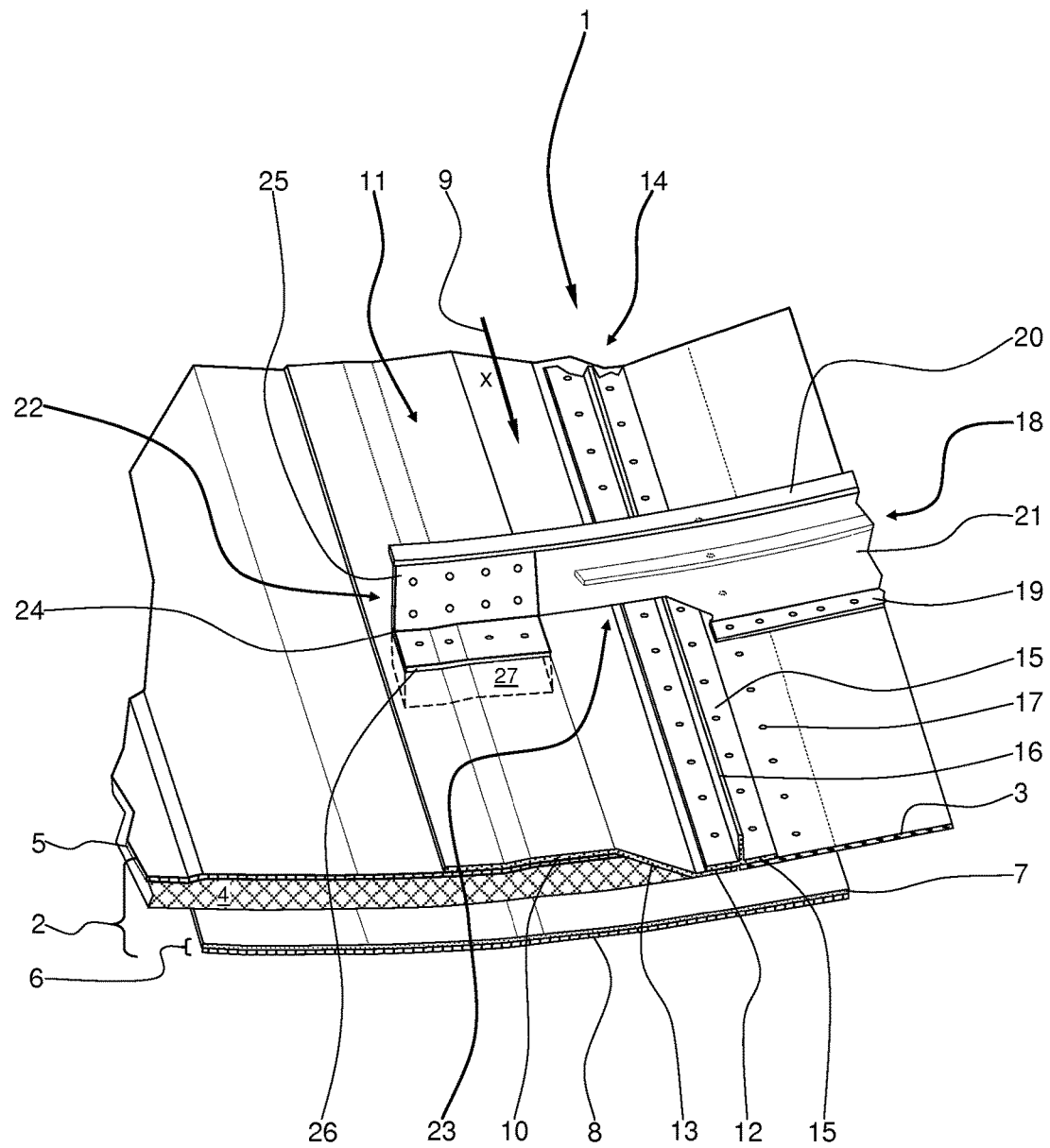
FIG. 1 shows a schematic perspective representation of an inventive longitudinal seam between a double-shell skin panel and a monolithic skin panel.

An ideal double-shell construction has the advantage, in particular, that fewer or no longitudinal braces and frames are required for reinforcing the fuselage cell such that the manufacturing expenditure is reduced and weight advantages can be realized. In contrast to monolithic skin panels, it is furthermore possible, under certain circumstances, to reduce the primary thermal insulation of double-shell skin panels.

In an embodiment, the fuselage cell structure is composed of a plurality of skin panels, longitudinal braces and transverse braces, particularly frames, such that a plurality of longitudinal and/or transverse seams are created, and wherein at least one skin panel is realized with a double-shell and at least one skin panel is realized monolithically.

In an aspect of the invention, a fuselage cell of hybrid construction is provided, in which plane skin panels and/or skin panels with at least a single curvature of monolithic and double-shell construction are combined with one another such that longitudinal and/or transverse seams are created by means of interfaces that are optimized with respect to the flow of forces, namely in such a way that weight savings are achieved and the manufacturing expenditure is simultaneously reduced.

In an embodiment, an almost arbitrary sequence of skin panels of monolithic and double-shell construction can be combined into a complex fuselage cell structure due to the fact that at least one longitudinal bracket with a first and a second longitudinal flange is provided in the region of the at least one longitudinal seam between a monolithic and a double-shell skin panel, wherein the longitudinal flanges are connected offset to one another by means of an inclined web, and/or that at least one load transfer point is provided in the region of the at least one transverse seam between a monolithic and a double-shell skin panel in order to connect at least one longitudinal brace situated on the monolithic skin panel to the at least one double-shell skin panel. In this case, it is possible to use skin panels of monolithic and double-shell construction in the regions of a fuselage cell structure, in which the respective construction promises the greatest static and constructive advantages.

In an embodiment, one complete fuselage section may, in principle, be composed of double-shell skin panels and an adjacent fuselage section may be realized with monolithic skin panels only.

Due to the longitudinal bracket with an inclined step provided in the interface between a double-shell skin panel and a monolithic skin panel, forces originating from the two cover layers of the sandwich component can be consolidated and introduced into the monolithic skin panel. In addition, the longitudinal bracket forms a border for the core structure of the double-shell skin panel.

In an embodiment, in the interface region of a longitudinal seam between a skin panel of monolithic construction and a skin panel of double-shell construction, a plurality of load transfer points are provided in order to realize the load transfer between the longitudinal braces arranged on the monolithic skin panel and a cover layer of the skin panel of double-shell construction.

According to an advantageous additional development of the fuselage cell structure, the first longitudinal flange is connected to an inner cover layer of the double-shell skin panel and the second longitudinal flange is connected to an outer cover layer of the double-shell skin panel, and the second longitudinal flange is connected to a monolithic skin panel such that a longitudinal seam is created by means of a bracket and/or a profile, particularly by means of a T-profile.

Due to the profile that is preferably realized in the form of a T-profile and with the aid of a suitable bracket, the monolithic skin the panel is butt-jointed to the second longitudinal flange of the longitudinal bracket on the inner side. The outer cover layer of the double-shell skin panel simultaneously bridges the joint between the second longitudinal flange and the monolithic skin panel on the outer side. The connection between all aforementioned components may be realized with rivets, bolts, at least sectional bonding or any combination of these joining techniques.

According to another advantageous embodiment, it is proposed that at least one frame of a monolithic skin panel features a recess on its underside in the region of the frame end, and that at least one angle is arranged in the region of the frame end.

The angle makes it possible to mechanically connect the frame end to the double-shell skin panel because no frames are usually required in the region of a double-shell skin panel. The angle may optionally form an integral component of the frame.

In an embodiment, if the number of frames in the region of the double-shell skin panel is reduced in relation to the monolithic skin panel, the frames therefore can be connected to the double-shell skin panel such that the flow of forces is optimized.

According to another embodiment of the invention, at least one transverse bracket with a first and a second transverse flange is arranged in the region of the at least one transverse seam, wherein the transverse flanges are largely connected offset and parallel to one another by means of a step.

Loads are transferred, although not primarily, between the double-shell skin panel and the monolithic skin panel by means of the transverse bracket. The transverse bracket simultaneously forms a border of the core structure of the double-shell skin panel.

FIG. 1 shows a perspective representation of an inventive longitudinal seam 1 between a double-shell skin panel 2 and a monolithic skin panel 3 of an aircraft fuselage cell of hybrid construction, i.e., an aircraft fuselage cell that is manufactured of a combination of monolithic and double-shell skin panels.

The double-shell skin panel 2 is realized with a core structure 4 that is provided with an inner cover layer 5 and an outer cover layer 6. The outer cover layer 6 is realized with an optional thickening 7 and a skin 8. An x-axis 9 that corresponds to the direction of flight of the aircraft fuselage cell extends approximately parallel to the longitudinal seam 1.

The longitudinal seam 1 is essentially realized with a longitudinal bracket 10. The longitudinal bracket 10 features a first flange 11 and a second flange 12 that are connected offset and about parallel to one another by means of a suitable web 13. In the context of this application, the term "parallelism" should not be interpreted in the strict sense of plane geometry. On the contrary, the term "parallel" presently means that two plane surfaces and/or surfaces that at least sectionally feature at least a single curvature such as, for example, the flanges 11, 12 virtually extend in space such that they at least sectionally are evenly spaced apart from one another. This means that, for example, the two flanges 11, 12 have a surface geometry with an essentially single curvature in approximately hollow-cylindrical fuselage cell sections while the flanges 11, 12 usually have a complex spherical surface geometry, i.e., a surface geometry that at least sectionally features a double curvature, in the tail and cockpit regions of the fuselage cell. On curved surface geometries, the degree of curvature may locally vary. In plane regions of a surface geometry, however, the flanges 11, 12 also have a correspondingly plane geometry.

An angle of inclination of the web 13 preferably amounts to less than 45°. The first flange 11 is connected to the inner cover layer 5 in the region of the longitudinal seam 1. The connection may be produced, for example, by means of riveting, bolting and/or bonding. The second flange 12 of the longitudinal bracket 10 is butt-jointed to the monolithic skin panel 3 such that the actual longitudinal seam 1 is created. In the exemplary embodiment according to FIG. 1, the actual connection between the second flange 12 and the monolithic skin panel 3 is produced with a T-profile 14 that essentially extends transverse to the x-axis 9 and consists of a base flange 15 and a web 16 that is centrally and perpendicularly arranged thereon. In this case, the base flange 15 of the T-profile 14 is rigidly connected to the second flange 12, as well as to the monolithic skin panel 3. On the underside, the outer cover layer 6 also bridges the region of the longitudinal seam 1 created by the butt joint between the second flange 12 and the monolithic skin panel 3, i.e., a mechanical connection is produced between the T-profile 14, the second flange 12, the monolithic skin panel 3 and the outer cover layer 6 of the double-shell skin panel 2. The connection between all aforementioned components may be conventionally produced with rivets, bolts and/or at least sectional bonding. In FIG. 1, one connecting element that is representative for all other connecting elements is identified by the reference symbol 17.

A frame 18 that extends about transverse to the longitudinal seam 1 features a bottom flange 19 and a top flange 20 that are connected to one another by means of a web 21 extending perpendicular thereto. In the region of the frame end 22, the underside of the frame 18 features a recess 23, as well as an angle 24 for connecting the frame end 22 to the double-shell skin panel 2. The angle 24 features a first and a second limb 25, 26 that are connected to the inner cover layer 5 of the double-shell skin panel 2 and the frame end 22.

The limbs 25, 26 include an angle of about 90°. The angle 24 makes it possible to produce a statically optimal connection between the frame end 22 and the double-shell skin panel 2. In a variation, another angle may be provided opposite of the angle 24 on the other side of the web 21 of the frame 18.

An optional recess 27 is situated within the core structure 4 of the double-shell skin panel 2 underneath the second limb 26 of the angle 24. This pocket-like recess 27 has a cuboid geometric shape in the exemplary embodiment shown and accommodates a reinforcing profile that is not illustrated in FIG. 1 and not only serves for connecting the frame end 22 to the inner cover layer 5, but also to the outer cover layer 6 of the double-shell skin panel 2. The recess 23 provided on the underside of the frame 18 in the region of the frame end 22 makes it possible to realize a height compensation between the double-shell skin panel 2 that has a substantial material thickness and the comparatively thin monolithic skin panel 3.

Figure 2:
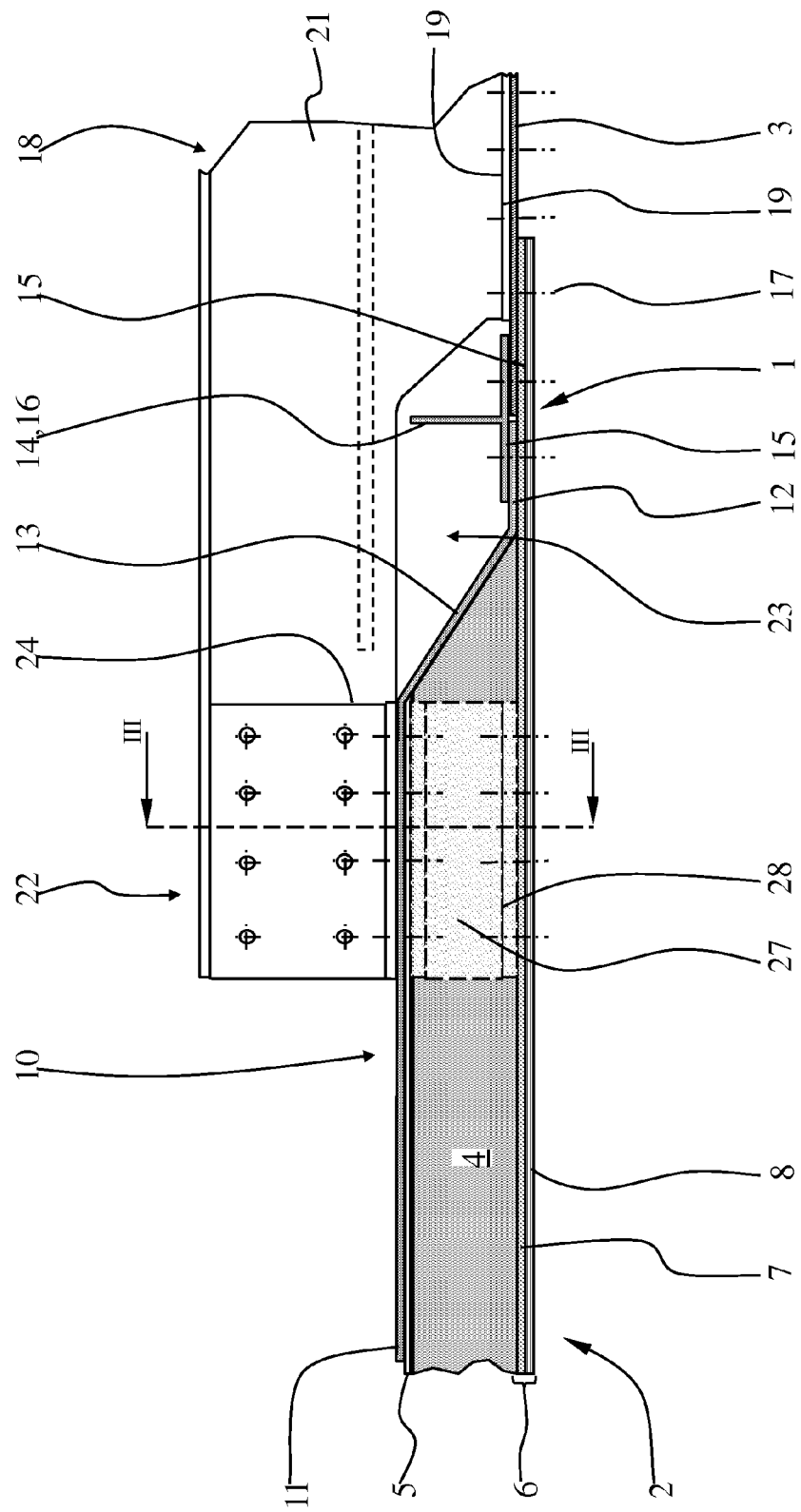
FIG. 2 shows a cross-sectional representation of FIG. 1 in the region of the frame end.

FIG. 2 shows a schematic cross-sectional representation through the inventive longitudinal seam 1 between the double-shell skin panel 2 and the monolithic skin panel 3.

The longitudinal seam 1 is created as a result of the connection of the second (right) longitudinal flange 12 of the longitudinal bracket 10 to the monolithic skin panel 3 by means of the base flange 15 of the T-profile 14 in interaction with the outer cover layer 6 of the double-shell skin panel 2 that completely overlaps the underside of the longitudinal seam 1. The connection of the inner cover layer 5 is realized with the first, left longitudinal flange 11 of the longitudinal bracket 10. Forces originating from the cover layers 5, 6 of the double-shell skin panel 2 are initially consolidated and then simultaneously transferred into the monolithic skin 3 on the upper side and the underside due to the rigid longitudinal bracket 10 in connection with the outer cover layer 6.

In order to increase the flexural strength of the longitudinal seam 1, the bottom flange 19 of the frame 18 is connected to the monolithic skin panel 3 and the frame end 22 is at least connected to the inner cover layer 5 of the double-shell skin panel 2 by means of the angle 24. The recess 23 provided on the underside of the frame 18 in the region of the frame end 22 serves for leveling the double-shell skin panel 2 and the monolithic skin panel 3 and furthermore makes it possible to transversely lead through the T-profile 14.

An optional recess 27 or pocket that has a cuboid shape in this case may be produced in the core structure 4. The optional recess 27 serves for integrating a hollow body with a suitable cross-sectional geometry such as, for example, a double-T-profile 28. As a supplement to the connection shown that is produced by means of the connecting elements, the double-T-profile 28 may at least sectionally be flatly connected, e.g. bonded, to the cover skins. Due to this measure, the frame end 22 can be additionally connected to the outer cover layer 6 of the double-shell skin panel 2 in a mechanically effective fashion. In contrast to the illustration according to FIG. 1, the connecting elements required for creating the complete longitudinal seam 1 are not indicated by circles or ellipses, but rather by dot-dash lines. The double-T-profile 28 or a hollow body to be accommodated in the recess 27 may be manufactured of a metallic material and/or a composite fiber material.

Figure 3:
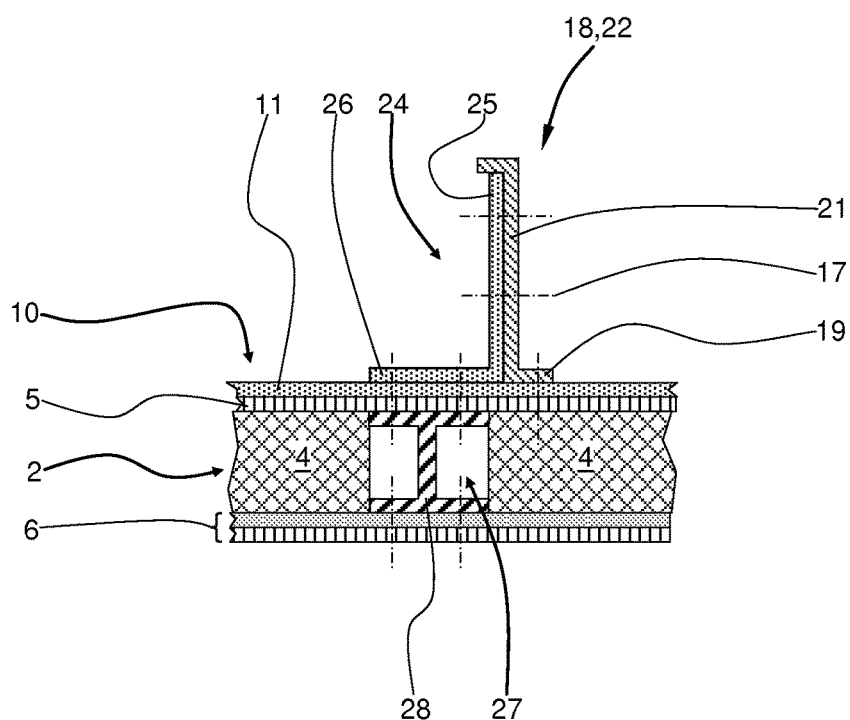
FIG. 3 shows a cross-sectional representation along the line of section III-III in FIG. 2.

FIG. 3 shows a simplified cross-sectional representation along the line of section III-III in FIG. 2.

The optional bottom flange 19 of the frame 18, the first flange 11 of the longitudinal bracket 10 and the inner cover layer 5 may be connected to one another by means of connecting elements that are not identified in the figures. The mechanical connection of the frame 18 to the double-shell skin panel 2 is realized with the angle 24, wherein the first limb 25 is connected to the web 21 of the frame 18 and the second limb 26 is joined to the first longitudinal flange 11, the inner cover layer 5 and the double-T-profile 28. In addition, the outer cover layer 6 of the double-shell skin panel 2 is also connected to the double-T-profile 28. Instead of a profile body in the form of a double-T-profile 28, any conceivable profile shape with suitable cross-sectional geometry such as, for example, a hollow rectangular profile may be integrated into the recess 27 in the core structure 4 of the double-shell skin panel 2 in order to connect the frame end 22.

The double-T-profile 28 therefore makes it possible to connect the frame end 22 to the inner cover layer 5, as well as the outer cover layer 6, of the double-shell skin panel 2 by means of the angle 24 such that a statically effective transfer of forces between the skin panels is achieved in the region of the longitudinal seam 1 of the abutting skin panels 2, 3.

Figure 4:
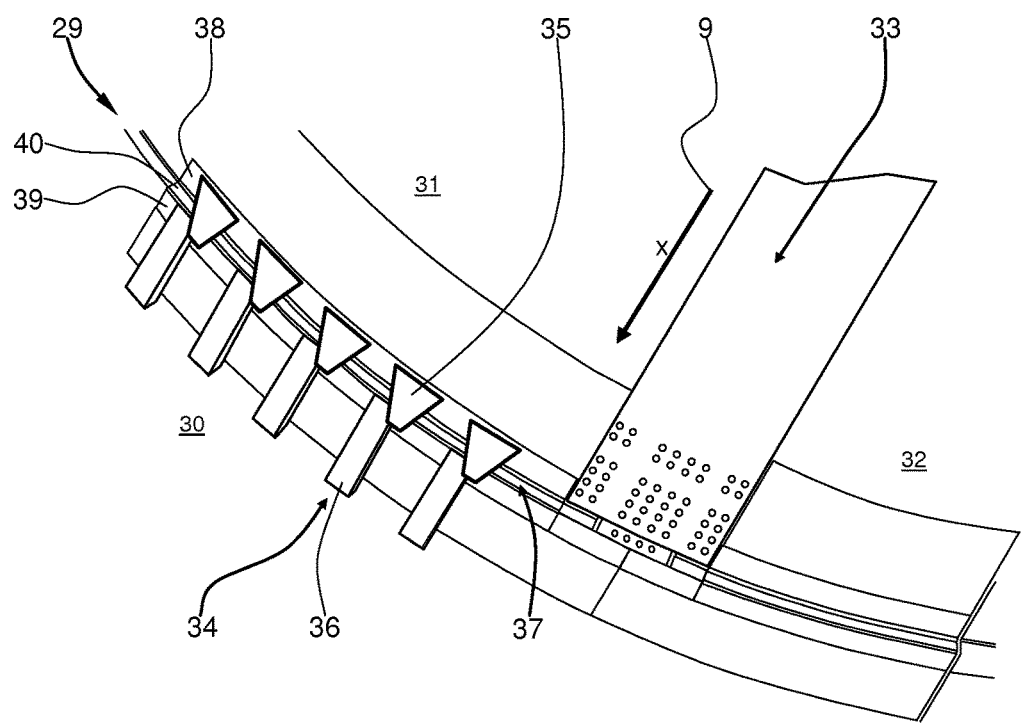
FIG. 4 shows a schematic perspective representation of an inventive transverse seam between a monolithic skin panel and a double-shell skin panel that features a plurality of load transfer points.

FIG. 4 shows a schematic representation of an inventive transverse seam (cross seam) between a monolithic skin panel and a double-shell skin panel that features a plurality of load transfer points.

A transverse seam 29 is created between a monolithic skin panel 30 and a double-shell skin panel 31. Another double-shell skin panel 32 is connected to the double-shell skin panel 31 by means of a double-shell interface 33. The connecting elements used in this case, particularly rivets and/or bolts, are indicated by small circles.

The direction of the x-axis 9 is equivalent to the direction of flight. A plurality of longitudinal braces are arranged on the monolithic skin panel 30, wherein these longitudinal braces extend approximately parallel to the x-axis 9 and are connected to the double-shell skin panel 31 at a plurality of load transfer points, one load transfer point 34 of which that is representative for all other load transfer points is identified by a reference symbol. On one end, the load transfer point 34 features a trapezoidal flange 35, by means of which the mechanical coupling to the double-shell skin panel 31 is realized. A profile section 36 with an L-shaped cross-sectional geometry extends underneath the trapezoidal flange 35 largely parallel to the x-axis 9 and serves for mechanically coupling the longitudinal braces extending on the monolithic skin panel. The load transfer point 34 is preferably realized in one piece. In order to improve the connection of the double-shell skin panel 31, an optional transverse bracket 37 extends underneath the load transfer point 34 and features a first transverse flange 38 and a second transverse flange 39 that are connected to one another by means of a step 40 that essentially extends perpendicular thereto. The transverse flanges 38, 39 are spaced apart and extend approximately parallel to one another, wherein the distance between the two transverse flanges 38, 39 essentially corresponds to the perpendicular step 40. The transverse bracket 37 is preferably realized in one piece. The transverse bracket 37 simultaneously forms a border of the core structure of the double-shell skin panel 31.

The monolithic skin panel 30, the longitudinal braces situated thereon, the load transfer points 34, the transverse bracket 37 and the double-shell skin panel 31 are joined by means of connecting elements that are not illustrated in FIG. 4, particularly rivets, studs, bonding, welding or any combination of these joining techniques.

Figure 5:
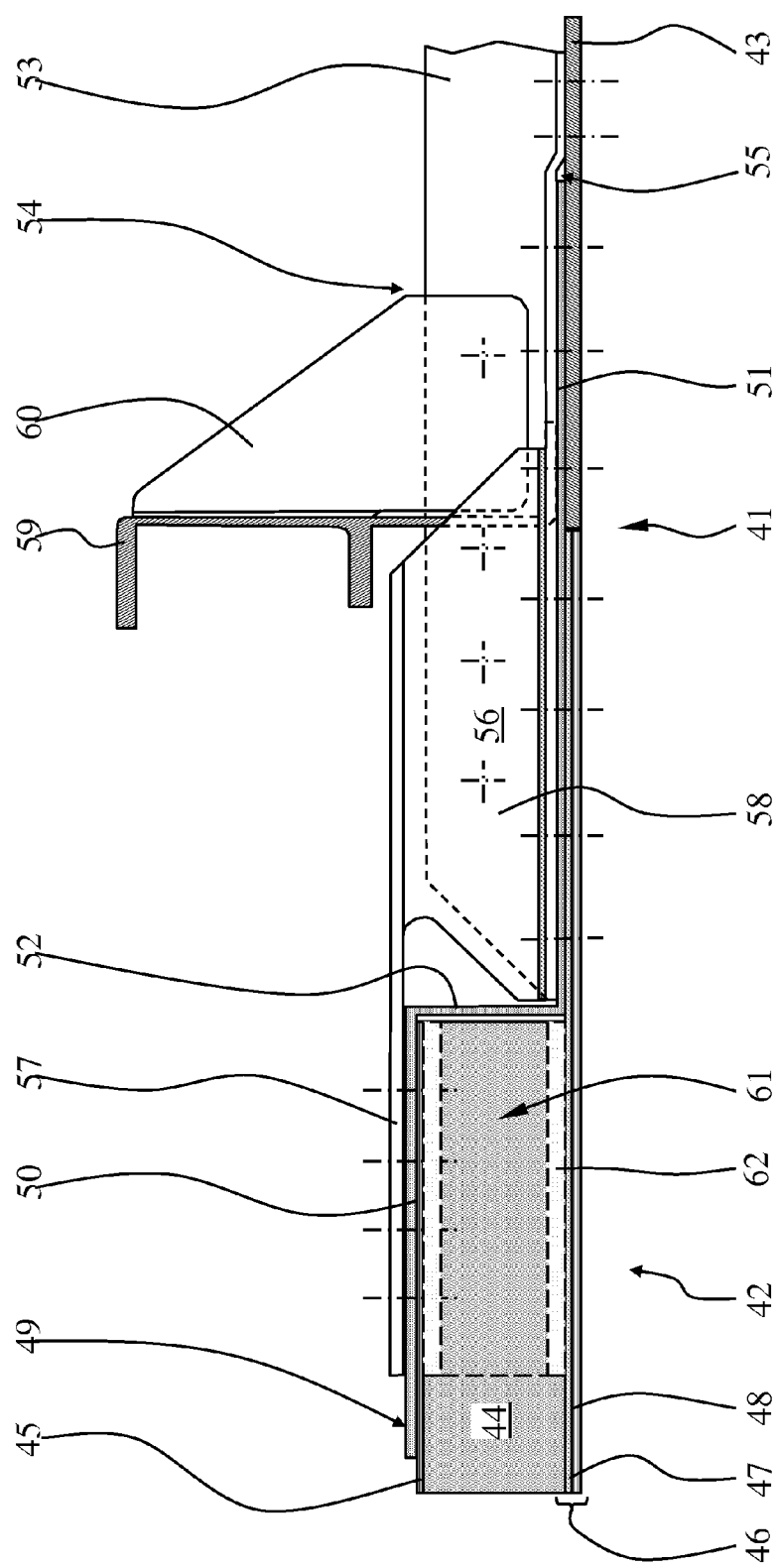
FIG. 5 shows a detailed sectional representation through an inventive transverse seam.

FIG. 5 shows a detailed sectional representation through an inventive transverse seam 41 between a double-shell skin panel 42 and a monolithic skin panel 43.

The double-shell skin panel 42 comprises a core structure 44 that is provided with an inner cover layer 45 and an outer cover layer 46. The outer cover layer 46 comprises a thickening 47, as well as the actual skin 48. A transverse bracket 49 extending in the region of the transverse seam features a first transverse flange 50 and a second transverse flange 51 that is spaced apart from and largely extends parallel to the first transverse flange, wherein the two transverse flanges 50, 51 are connected to one another by an about perpendicular step 52. A longitudinal brace 53 extends in the region of the monolithic skin panel 43, wherein a small vertical offset 55 is provided in the end section 54 of this longitudinal brace for height compensation purposes. The end section 54 lies on the second transverse flange 51 in the region of the transverse seam 41. The mechanical coupling between the longitudinal brace 53 in the region of the monolithic skin panel 43 and the double-shell skin panel 42 is realized with a load transfer point 56, one end of which features a trapezoidal flange 57 and the opposite end of which is realized in the form of a profile section 58 with an essentially L-shaped cross-sectional geometry.

In the region of the double-shell skin panel 42, the transverse seam 41 is formed by the trapezoidal flange 57 that is connected to the first transverse flange 50 of the transverse bracket 49, as well as to the inner cover layer 45. In addition, the profile section 58 of the load transfer point 56 is connected to the second transverse flange 51, as well as to the outer cover layer 46. Furthermore, a connection between the longitudinal brace 53, the second transverse flange 51 and the monolithic skin panel 43, as well as the end section 54 of the longitudinal brace 53, is produced on the monolithic side of the transverse seam 41.

As a matter of completeness, the illustration in FIG. 5 shows a frame 59 and a support angle 60 that are likewise connected to the end section 54 of the longitudinal brace 53, the second transverse flange 51 and the monolithic skin panel 43 in the region of the transverse seam 41.

Alternatively, a profile body or a profile section such as, for example, a double-T-profile 62 may be integrated into a recess 61 of the core structure 44 in order to additionally connect, in particular, the load transfer point 56 to the outer cover layer of the double-shell skin panel 42 (see FIG. 3). The double-T-profile 62 may be manufactured of a metallic material and/or a fiber-reinforced plastic material. The connection of the double-T-profile 62 to the core structure 44, the cover layers 45, 46 and the load transfer point 56 may be realized with the aid of connecting elements and/or at least sectional bonding and/or embedding in foam.

In an alternative embodiment of the transverse seam 41 that is not illustrated in FIG. 5, the longitudinal brace 53 ends before it reaches the transverse seam 41. In this case, the load transfer point 56 is selectively realized in the form of an integral or differential component. In an integral design, the load transfer point 56 would have to be manufactured in such a way that the trapezoidal flange 57 and the profile section 58 are combined into a single component. In a differential design, the load transfer point 56 is selectively realized in the form of two or more components for the trapezoidal flange 57, the profile section 58 and the connection to the longitudinal brace 53 by means of a separate profile or profile body that may, for example, have an L-shaped cross-sectional geometry or any other conceivable cross-sectional geometry. In this case, the load transfer point 56 may be selectively connected directly to the longitudinal brace 53 and/or between two longitudinal braces, wherein an additional transverse bracket can be used for connecting the monolithic and the double-shell skin panels 43, 42.

The advantage of this variation can be seen, among other things, in that it is possible to eliminate the offset 55 in the end region of the longitudinal brace 53 that would otherwise be required for height compensation purposes and involves an elaborate manufacturing technology, particularly when using composite fiber materials.

The connections between all aforementioned components are produced with bolts, rivets, screws, welding and/or at least sectional bonding as indicated with dot-dash lines in FIG. 5.

FIG. 6 shows a schematic representation of a variation of a transverse seam for connecting a monolithic skin panel to a double-shell skin panel, namely in the form of a top view from the interior of a fuselage cell structure.

A monolithic skin panel 70 is connected to a double-shell skin panel 71. The double-shell skin panel 71 comprises an inner and an outer cover layer 72, 73, between which a core structure 74 is arranged.

In the region of a monolithic window frame 75 with a window element 76 accommodated therein and in the region of the transverse seam 77, the core structure 74 and the inner cover layer 72 of the double-shell skin panel 71 were removed in order to create a recess 78 in the double-shell skin panel 71. The geometry of the recess 78 approximately corresponds to a rectangular edge strip that is situated directly adjacent to the transverse seam 77 and bordered by a square region for the window frame 75 on the right side.

The transverse seam 77 is formed, for example, by means of a transverse bracket between the monolithic skin panel 70 and the outer cover layer 73 of the double-shell skin panel 71 that is exposed in this region, wherein said transverse bracket is arranged and mounted on the inner side. Two so-called double-shell window frames 79, 80 designed for being integrated into double-shell skin panels are situated in the region of the double-shell skin panel 71, in which the core structure 74 still exists and features cover layers 72, 73 on both sides.

The lateral border of the core structure 74 that is otherwise open transverse to the direction of the transverse seam 77 is—as indicated in sectional representation I—formed by a horizontally extending longitudinal bracket 81. This figure shows that the longitudinal bracket 81 connects the outer and the inner cover layers 72, 73. Another longitudinal bracket 82 extends in the horizontal direction underneath the three window frames 75, 79 and 80. A monolithic skin panel that is not identified by a reference symbol may be optionally connected to the double-shell skin panel 71 by means of the lower longitudinal bracket 82 such that a longitudinal seam 83 is created. The design of the longitudinal bracket 81, 82 corresponds to the design of the longitudinal bracket that was already described in detail above with reference to FIGS. 1 to 3 and features two longitudinal flanges that are respectively connected by an inclined web. The structure of the longitudinal seam 83 also corresponds to the structure of the longitudinal seam described with reference to FIGS. 1 to 3.

The lateral border of the core structure 74 parallel to the direction of the transverse seam 77 is formed—as illustrated in sectional representation III—by a transverse bracket 84 with two transverse flanges that are connected by a perpendicular, step-like web and not identified by a reference symbol. A connection between the two cover layers 72, 73 of the double-shell skin panel 71 and an additional connection to the window frame 75 is achieved with the transverse bracket 84.

The longitudinal braces 88, 89 of the monolithic skin panel 70 are connected to the double-shell skin panel 71 in the region of the transverse seam 77 by means of a transverse bracket 85 and two trapezoidal flanges 86, 87 connected thereto. The connection of the longitudinal braces 88, 89 to the trapezoidal flanges 86, 87 is realized with the aid of profile sections that are not identified in the figure and respectively have a preferably L-shaped cross-sectional geometry (see, in particular, FIG. 4, reference symbol 36), wherein the profile sections are preferably realized in the form of integral components of the trapezoidal flanges 86, 87. Alternatively, the profile sections may be connected to the trapezoidal flanges 86, 87 with the aid of suitable connecting elements. The trapezoidal flanges 86, 87 respectively form one of two load transfer points 90, 91 for transferring forces between the skin panels 70, 71 together with one of the two profile sections.

The design of the transverse brackets 84, 85 once again corresponds to the design of the transverse brackets according to FIGS. 4 and 5 used for creating the transverse seam between a monolithic and a double-shell skin panel. The longitudinal brackets 81, 82 and the transverse brackets 84, 85 ideally may be realized such that they can be connected to one another in a largely gap-free and accurately fitted fashion by respectively producing miter joints on their ends.

Sectional representation II shows a schematic cross section through the window frames 79, 80 inserted into the double-shell skin panel 71 while sectional representation IV shows a schematic section through the monolithic window frame 75 and the outer cover layer 73 of the double-shell skin panel 71, as well as the monolithic skin panel 70.

The alternative embodiment of the transverse seam 77 between the monolithic skin panel 70 and the double-shell skin panel 71 described with reference to FIG. 6 not only allows the integration of the window frame 75 in the region of the transverse seam 77, but particularly an "equalization" of the transverse seam 77 in static respects, i.e., an advantageous flow of loads from the monolithic skin panel 70 into the double-shell skin panel 71 and vice versa. This can be realized because the window frame 75 is arranged in the region of the recess 78 produced by removing the core structure 74 and the inner cover layer 72 from the double-shell skin panel 71 in the region of the transverse seam 77. In the region of this recess 78, the double-shell skin panel 71 represents a "pseudo-" monolithic skin panel, whereby the transverse seam 77 that in fact extends linearly is "extended" into the double-shell skin panel 71 at least in the region of the window frame 75 and the effect of the butt joint between the skin panels 70, 71 is locally equalized in static respects.

The longitudinal and transverse seams created in accordance with the invention may be used between any monolithic and double-shell skin panels that are sectionally plane and/or at least sectionally feature a single curvature.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE SYMBOLS

| | | |
|---|---|---|
| 1 | Longitudinal seam | |
| 2 | Double-shell skin panel | |
| 3 | Monolithic skin panel | |
| 4 | Core structure | |
| 5 | Inner cover layer | |
| 6 | Outer cover layer | |
| 7 | Thickening | |
| 8 | Skin | |
| 9 | x-axis | |
| 10 | Longitudinal bracket | |
| 11 | First longitudinal flange | |
| 12 | Second longitudinal flange | |
| 13 | Inclined web | |
| 14 | T-profile | |
| 15 | Base flange | ⎫ |
| 16 | Web | ⎬ T-profile |
| 17 | Connecting element | ⎭ |
| 18 | Frame | |
| 19 | Bottom flange | ⎫ |
| 20 | Top flange | ⎬ Frame |
| 21 | Web | ⎭ |
| 22 | Frame end | |
| 23 | Recess (frame) | |
| 24 | Angle | ⎫ |
| 25 | First limb | ⎬ Angle |
| 26 | Second limb | ⎭ |
| 27 | Recess (pocket) | |
| 28 | Double-T-profile | |
| 29 | Transverse seam | |
| 30 | Monolithic skin panel | |
| 31 | Double-shell skin panel | |
| 32 | Double-shell skin panel | |
| 33 | Double-shell interface | |
| 34 | Load transfer point | |
| 35 | Trapezoidal flange | |
| 36 | Profile section | |
| 37 | Transverse bracket | |
| 38 | First transverse flange | |
| 39 | Second transverse flange | |
| 40 | Step | |
| 41 | Transverse seam | |
| 42 | Double-shell skin panel | |
| 43 | Monolithic skin panel | |
| 44 | Core structure | |
| 45 | Inner cover layer | |
| 46 | Outer cover layer | |
| 47 | Thickening | |
| 48 | Skin | |
| 49 | Transverse bracket | |
| 50 | First transverse flange | |
| 51 | Second transverse flange | |
| 52 | Step | |
| 53 | Longitudinal brace | |
| 54 | End section | ⎫ |
| 55 | Offset | ⎬ Longitudinal brace |
| 56 | Load transfer point | |
| 57 | Trapezoidal flange | ⎫ |
| 58 | Profile section | ⎬ Load transfer point |
| 59 | Frame | |
| 60 | Support angle | |
| 61 | Recess | |
| 62 | Double-T-profile | |
| 70 | Monolithic skin panel | |
| 71 | Double-shell skin panel | |
| 72 | Inner cover layer | |
| 73 | Outer cover layer | |
| 74 | Core structure | |
| 75 | Window frame (monolithic) | |
| 76 | Window element | |
| 77 | Transverse seam | |
| 78 | Recess (in double-shell skin panel) | |
| 79 | Window frame (double-shell) | |
| 80 | Window frame (double-shell) | |
| 81 | Longitudinal bracket | |
| 82 | Longitudinal bracket | |
| 83 | Longitudinal seam | |
| 84 | Transverse bracket | |

LIST OF REFERENCE SYMBOLS

| | |
|---|---|
| 85 | Transverse bracket |
| 86 | Trapezoidal flange |
| 87 | Trapezoidal flange |
| 88 | Longitudinal brace |
| 89 | Longitudinal brace |
| 90 | Load transfer point |
| 91 | Load transfer point |

The invention claimed is:

1. A fuselage cell structure for an aircraft comprising:
at least two skin panels including at least one double shell skin panel and at least one monolithic skin panel;
at least one longitudinal brace disposed on the at least one monolithic skin panel;
at least one transverse seam between the at least one double shell skin panel and the at least one monolithic skin panel;
at least one load transfer point element, and
at least one transverse bracket disposed in the region of the at least one transverse seam and having a first transverse flange and a second transverse flange connected to one another so as to be substantially parallel to one another and offset via a step,
wherein the at least one load transfer point element is disposed in a region of the at least one transverse seam so as to connect the at least one longitudinal brace disposed on the at least one monolithic skin panel to the at least one double shell skin panel.

2. The fuselage cell structure as recited in claim 1, wherein the flange includes a trapezoidal flange and the profile section includes an L-shaped cross-section.

3. The fuselage cell structure as recited in claim 1, wherein the first transverse flange is connected, by at least one of rivets and bonds, to an inner cover layer of the at least one double shell skin panel and the second transverse flange is connected to an outer cover layer of the at least one double shell skin panel and to the at least one monolithic skin panel.

4. The fuselage cell structure as recited in claim 1, wherein the load transfer point element is configured as a single component.

5. The fuselage cell structure as recited in claim 1, wherein an end section of the at least one longitudinal brace includes a vertical offset so as to compensate for a height.

6. The fuselage cell structure as recited in claim 1, further comprising a frame with at least one support angle disposed in a region of the transverse seam.

7. The fuselage cell structure as recited in claim 1, wherein at least one recess is disposed in a core structure and an inner cover layer of the at least one double shell skin panel in the region of the at least one transverse seam.

8. The fuselage cell structure as recited in claim 7, wherein at least one monolithic window frame is integrated into a region of the at least one recess.

9. The fuselage cell structure as recited in claim 7, further comprising at least one longitudinal bracket,
wherein the at least one longitudinal bracket is disposed in a region of a longitudinal seam and includes a first longitudinal flange and a second longitudinal flange disposed offset with respect to one another and connected by a web,
the at least one longitudinal bracket and the at least one transverse bracket forming a lateral border of the core structure in a region of the at least one recess.

10. A fuselage cell structure for an aircraft comprising:
at least two skin panels including at least one double shell skin panel and at least one monolithic skin panel;
at least one transverse brace;
at least one longitudinal seam between the at least one double shell skin panel and the at least one monolithic skin panel; and
at least one first longitudinal bracket;
wherein the at least one first longitudinal bracket is disposed in a region of the at least one longitudinal seam and includes a first longitudinal flange and a second longitudinal flange disposed offset with respect to one another and connected by a web,
wherein the at least one transverse brace includes at least one frame disposed on the at least one monolithic skin panel and having a recess disposed on an underside of the frame in a region of a frame end and at least one connecting element disposed in the region of the frame end, and
wherein the connecting element is connected to the frame in the region of the frame end and to the first longitudinal flange.

11. The fuselage cell structure as recited in claim 10, wherein the first longitudinal flange is connected to an inner cover layer of the at least one double shell skin panel and the second longitudinal flange is connected to an outer cover layer of the at least one double-shell skin panel, and
wherein at least one of a second longitudinal bracket or a profile connects the second longitudinal flange to the at least one monolithic skin panel.

12. The fuselage cell structure as recited in claim 11, wherein the profile includes a T-profile.

13. The fuselage cell structure as recited in claim 12, wherein the outer cover layer includes an outer cover skin having an at least sectional thickening.

14. The fuselage cell structure as recited in claim 10, wherein the connecting element comprises at least one angle brace including a first limb and a second limb forming a 90° angle, the first limb being connected, by at least one of rivets or bonds, to the frame in the region of the frame end and the second limb being connected to the first longitudinal flange.

15. The fuselage cell structure as recited in claim 14, wherein the second limb is connected to the at least one double shell skin panel by a profile body disposed in a recess of a core structure of the at least one double-shell skin panel.

16. The fuselage cell structure as recited in claim 15, wherein the profile body is a double T-profile.

* * * * *